US012649686B2

(12) United States Patent
Mao et al.

(10) Patent No.: US 12,649,686 B2
(45) Date of Patent: Jun. 9, 2026

(54) GLASS POWDER FOR N-TYPE SILVER-ALUMINUM PASTE AND PREPARATION METHOD THEREOF

(71) Applicants: NANTONG T-SUN NEW ENERGY CO., LTD., Nantong (CN); NANTONG TIANSHENG NEW ENERGY TECHNOLOGY CO., LTD., Nantong (CN)

(72) Inventors: Ping Mao, Nantong (CN); Jinhua Zheng, Nantong (CN)

(73) Assignees: NANTONG T-SUN NEW ENERGY CO., LTD., Nantong (CN); NANTONG TIANSHENG NEW ENERGY TECHNOLOGY CO., LTD., Nantong (CN)

( * ) Notice: Subject to any disclaimer, the term of this patent is extended or adjusted under 35 U.S.C. 154(b) by 690 days.

(21) Appl. No.: 17/777,945

(22) PCT Filed: Nov. 30, 2020

(86) PCT No.: PCT/CN2020/132700
§ 371 (c)(1),
(2) Date: May 18, 2022

(87) PCT Pub. No.: WO2022/052331
PCT Pub. Date: Mar. 17, 2022

(65) Prior Publication Data
US 2023/0357074 A1 Nov. 9, 2023

(30) Foreign Application Priority Data
Sep. 11, 2020 (CN) .......................... 202010955453.5

(51) Int. Cl.
| | |
|---|---|
| *C03C 8/10* | (2006.01) |
| *C03C 3/07* | (2006.01) |
| *C03C 8/18* | (2006.01) |
| *H01B 1/02* | (2006.01) |
| *H01B 13/00* | (2006.01) |

(52) U.S. Cl.
CPC .................. *C03C 8/10* (2013.01); *C03C 3/07* (2013.01); *C03C 8/18* (2013.01); *H01B 1/023* (2013.01); *H01B 13/0016* (2013.01)

(58) Field of Classification Search
CPC .... C03C 8/18; C03C 8/10; C03C 8/04; C03C 8/06; C03C 3/07; H01B 1/14; H01B 1/16; H01B 1/18
See application file for complete search history.

(56) References Cited

U.S. PATENT DOCUMENTS

| | | | |
|---|---|---|---|
| 2013/0071968 A1* | 3/2013 | Machii .................... | H10F 77/12 257/E31.124 |
| 2014/0299256 A1* | 10/2014 | Sridharan ................. | C03C 8/24 156/109 |
| 2015/0027524 A1* | 1/2015 | Seyedmohammadi ...................... | H10F 77/227 252/514 |
| 2015/0075597 A1* | 3/2015 | Kurtz .................... | H10F 77/935 252/514 |
| 2015/0122323 A1* | 5/2015 | Khatri ................... | H10F 77/223 136/256 |

FOREIGN PATENT DOCUMENTS

CN 104926109 A * 9/2015

* cited by examiner

*Primary Examiner* — Elizabeth A. Bolden
(74) *Attorney, Agent, or Firm* — CBM Patent Consulting, LLC

(57) ABSTRACT

A glass powder for N-type silver-aluminum paste comprises a lead-containing compound, a silicon-containing compound, a thallium-containing compound and a zinc-containing compound, wherein the compounding of the thallium-containing compound and the lead-containing compound confers good silver melting capability on the glass powder, and the prepared silver-aluminum paste has good wettability to the surface of a solar cell silicon wafer; the silicon-containing compound provides a more complete network structure for the glass powder; and the zinc-containing compound reduces the softening temperature of the glass powder and further reduces the sintering temperature of the prepared N-type silver-aluminum paste; further comprises a compound containing a first main group metal element, and the compound can react with a zinc-containing compound to further reduce the softening temperature of the glass powder, further reduce the sintering temperature of the prepared N-type silver-aluminum paste and improve the preparation yield of the N-type solar cell.

9 Claims, 2 Drawing Sheets

GLASS POWDER FOR N-TYPE SILVER-ALUMINUM PASTE AND PREPARATION METHOD THEREOF

TECHNICAL FIELD

The present invention relates to the technical field of conductive materials containing metals or alloys, and particularly relates to a glass powder for N-type silver-aluminum paste and a preparation method thereof.

BACKGROUND

For the silver-aluminum paste of N-type solar cell, the glass powder is an important factor to determine contact resistance, surface etching reaction and electrical performances of the whole cell, which requires it to have good electrical performances and mechanical performances. In addition, the type and amount of the glass powder also have a great influence on the voltage of open circuit and the filling factor of the paste under the condition of high temperature sintering. In the sintering step of the solar cell manufacturing process, the glass powder in the silver-aluminum paste is in contact and bonded with the lower silicon layer after corroding the SiNx antireflection film layer, and a sufficient and complete etching reaction can ensure that good ohmic contact is formed.

Although the glass powder accounts for a relatively small proportion (1-5 wt %) in the paste, it plays an important role in the contact forming process of the Ag—Si metal semiconductor, and its stable bonding performance is ensured by corroding the SiNx antireflection film layer in an etching reaction. As a bonding phase, the glass powder not only promotes the adhesion of the silver-aluminum paste to the silicon substrate of the solar cell in the sintering process, but also affects the sintering kinetics of the metal powder of the conductive functional phase. In addition to the relevant properties of the basic bonding phase, the glass powder for the front electrode silver-aluminum paste will be able to completely etch the silicon nitride antireflection film in the sintering process and form a contact layer between Ag and Si after the sintering, so that a good ohmic contact is formed between the silver powder and the silicon substrate, and the purpose of effectively improving the photoelectric conversion efficiency of the solar cell can be achieved.

Chinese patent CN200610011001.1 discloses a composition and a preparation method of a conductive aluminum paste for silicon solar cell back surface field, wherein thallium is used as an inorganic binder in the conductive aluminum paste for silicon solar cell back surface field, the inorganic binder can form a good ohmic contact between an aluminum electrode and silicon to improve the photoelectric conversion efficiency, and the silicon-aluminum compound layer can improve the adhesion strength of the aluminum film to the silicon substrate.

Chinese patent CN201210123378.1 discloses a conductive paste for solar cell back surface field, a preparation method thereof and a solar cell, wherein an aluminum-thallium alloy containing thallium and aluminum elements is used as conductive metal powder, a back field metal film prepared from the conductive paste has a smooth surface and an excellent appearance, a formed PP+ layer has excellent performance, the voltage of open circuit of the cell is high, the photoelectric conversion efficiency is high, the adhesion of the prepared metal film to a silicon wafer is strong, and the prepared solar cell has small curvature.

SUMMARY

The present invention provides a glass powder for N-type silver-aluminum paste and a preparation method thereof, wherein the glass powder for N-type silver-aluminum paste, when containing thallium element, may have good silver melting capability and good wettability to a silicon wafer for a solar cell, so that a good ohmic contact is formed between metal powder and the surface of the silicon. The specific contents of the present invention are as follows:

One purpose of the present invention is to provide a glass powder for N-type silver-aluminum paste, which comprises a lead-containing compound, a silicon-containing compound, a thallium-containing compound and a zinc-containing compound.

In some embodiments of the present invention, the compound described above may be at least one of an oxide, a halide, a nitrate compound, a nitrite compound, a carbonate compound, a bicarbonate compound, a sulfate compound, and a phosphate compound.

In some embodiments of the present invention, the halide described above is at least one of chloride, fluoride, bromide and iodide.

In some embodiments of the present invention, the halide described above is chloride.

In some embodiments of the present invention, the glass powder for N-type silver-aluminum paste described above further comprises a compound containing a first main group metal element.

In some embodiments of the present invention, the compound containing the first main group metal element described above is at least one of a lithium-containing compound, a sodium-containing compound, a potassium-containing compound, a rubidium-containing compound, and a cesium-containing compound.

In some embodiments of the present invention, the glass powder for N-type silver-aluminum paste described above is a composition of formula (I):

$$Pb_a—Si_b—Tl_c—Zn_d-M_e—O_f,  \qquad \text{formula (I);}$$

wherein a, b, c, d, e and f represent the amount of substance of elements contained in the glass powder for N-type silver-aluminum paste per 1 mol, and 0.6 mol≤a≤0.8 mol, 0.05 mol≤b≤0.2 mol, 0.03 mol≤c≤0.1 mol, 0.01 mol≤d≤0.1 mol, 0.001 mol≤e≤0.02 mol, and f has an amount of substance which balances the group consisting of Pb element, Si element, Tl element, Zn element and M element, wherein the M element is at least one of lithium element, sodium element, potassium element, rubidium element and cesium element.

In some embodiments of the present invention, the glass powder for N-type silver-aluminum paste described above has a median particle size of 0.5-2 μm.

In some embodiments of the present invention, the glass powder for N-type silver-aluminum paste described above has a softening point of 300-450° C.

Another purpose of the present invention is to provide a glass powder for N-type silver-aluminum paste, which is prepared as follows:

step I: accurately weighing a lead-containing compound, a silicon-containing compound, a thallium-containing compound and a zinc-containing compound after calculating their amounts, and uniformly mixing and stirring them to obtain a mixture A;

step II: placing the mixture A obtained in the step I in a sintering furnace for promoting sintering to obtain a mixture B, wherein the sintering furnace has a sintering temperature of 900-1200° C. and a sintering time of 20-60 min;

step III: placing the mixture B obtained in the step II in a cooling roller for cooling to obtain a mixture C, wherein the cooling roller has a rotating speed of 3-7 rmp and a cooling time of 1-2 h;

step IV: placing the mixture C obtained in the step III in a ball mill for ball milling to obtain a mixture D, wherein the ball mill has a rotating speed of 300-350 rmp and a ball milling time of 2-6 h;

step V: placing the mixture D obtained in the step IV in a vibrating screen of 150-250 mesh for screening, and then placing the screened mixture D in an oven for drying at a temperature of 80-150° C. for 2-6 h to obtain the glass powder for N-type silver-aluminum paste.

Compared with the prior art, the present invention has the following beneficial effects.

The glass powder for N-type silver-aluminum paste provided in the present invention comprises a lead-containing compound, a silicon-containing compound, a thallium-containing compound and a zinc-containing compound, wherein the compounding of the thallium-containing compound and the lead-containing compound confers good silver melting capability on the glass powder, and the prepared silver-aluminum paste has good wettability to the surface of a solar cell silicon wafer; the silicon-containing compound provides a more complete network structure for the glass powder; and the zinc-containing compound reduces the softening temperature of the glass powder and further reduces the sintering temperature of the prepared N-type silver-aluminum paste. The glass powder for N-type silver-aluminum paste of the present application further comprises a compound containing a first main group metal element, and the compound can react with a zinc-containing compound to further reduce the softening temperature of the glass powder, further reduce the sintering temperature of the prepared N-type silver-aluminum paste and improve the preparation yield of the N-type solar cell.

DETAILED DESCRIPTION

Figure 1:
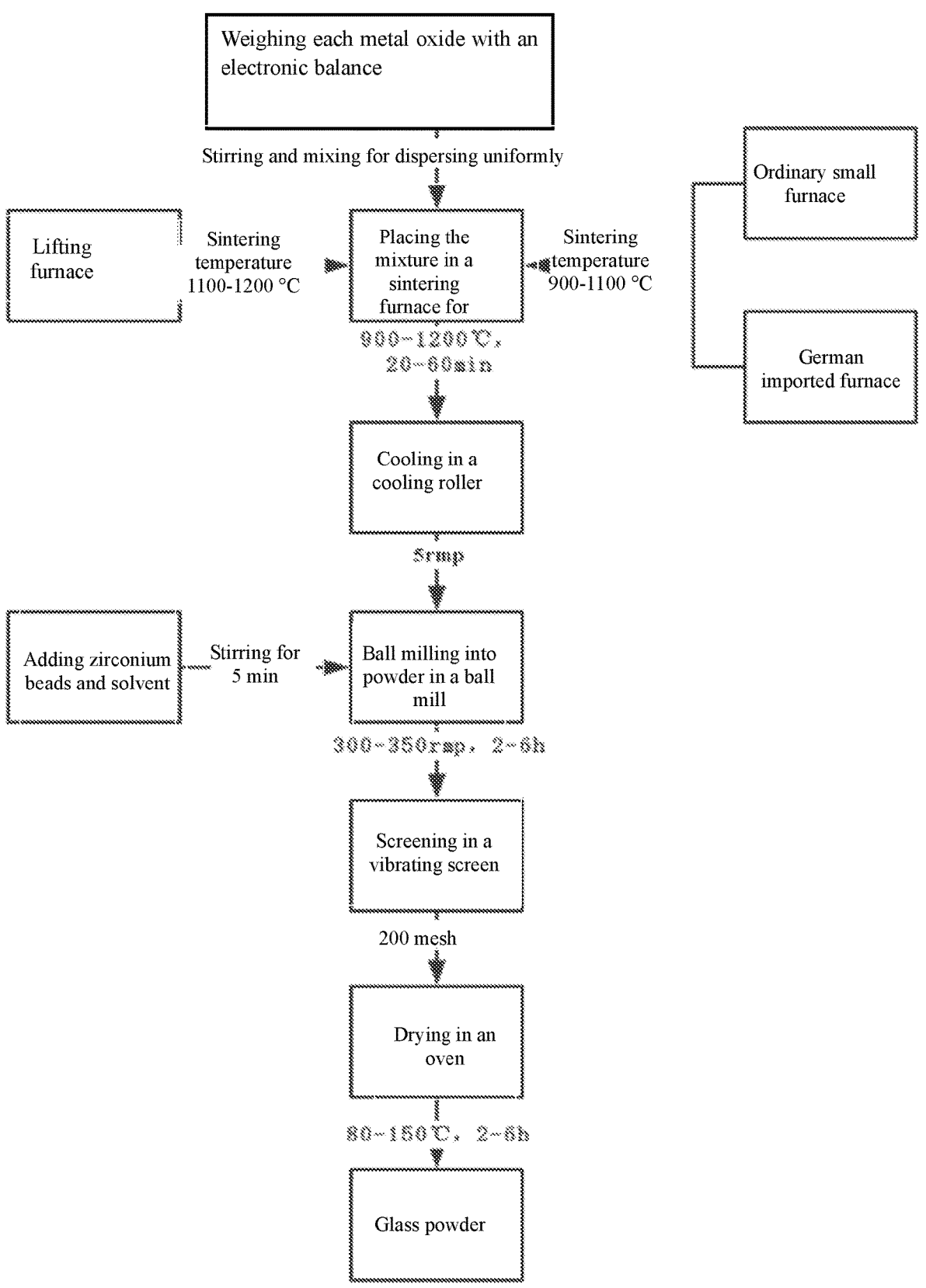
FIG. 1 is a flow chart of the preparation of glass powder for N-type silver-aluminum paste of the present invention.

Glass powder for N-type silver-aluminum paste comprises a lead-containing compound, a silicon-containing compound, a thallium-containing compound and a zinc-containing compound. The compound herein is at least one of an oxide, a halide, a nitrate compound, a nitrite compound, a carbonate compound, a bicarbonate compound, a sulfate compound and a phosphate compound, preferably, the halide of the present application is at least one of chloride, fluoride, bromide and iodide, more preferably, the halide of the present application is chloride. The compounding of the thallium-containing compound and the lead-containing compound confers good silver melting capability on the glass powder, and the prepared silver-aluminum paste has good wettability on the surface of a solar cell silicon wafer; the silicon-containing compound provides a more complete network structure for the glass powder; and the zinc-containing compound reduces the softening temperature of the glass powder, and further reduces the sintering temperature of the prepared N-type silver-aluminum paste. The glass powder for N-type silver-aluminum paste of the present invention further comprises a compound containing a first main group metal element, preferably, the first main group compound of the present invention is at least one of a lithium compound, a sodium-containing compound, a potassium-containing compound, a rubidium-containing compound and a cesium-containing compound, and the compound can react with the zinc-containing compound to further reduce the softening temperature of the glass powder, further reduce the sintering temperature of the prepared N-type silver-aluminum paste and improve the preparation yield of the N-type solar cell.

The prepared glass powder for N-type silver-aluminum paste of the present invention is a composition of formula (I):

$$Pb_a\text{—}Si_b\text{—}Tl_c\text{—}Zn_dM_e\text{—}O_f, \qquad \text{formula (I);}$$

wherein a, b, c, d, e and f represent the amount of substance of elements contained in the glass powder for N-type silver-aluminum paste per 1 mol, and 0.6 mol≤a≤0.8 mol, 0.05 mol≤b≤0.2 mol, 0.03 mol≤c≤0.1 mol, 0.01 mol≤d≤0.1 mol, 0.001 mol≤e≤0.02 mol, and f has an amount of substance which balances the group consisting of Pb element, Si element, Tl element, Zn element and M element, wherein the M element is at least one of lithium element, sodium element, potassium element, rubidium element and cesium element. The prepared glass powder for N-type silver-aluminum paste has a median particle size of 0.5-2 μm and a softening point of 300-450° C.

According to the above formula, the glass powder for N-type silver-aluminum paste of the present invention according to the above formula is prepared as follows:

step I: accurately weighing a lead-containing compound, a silicon-containing compound, a thallium-containing compound and a zinc-containing compound after calculating their amounts, and uniformly mixing and stirring them to obtain a mixture A;

step II: placing the mixture A obtained in the step I in a sintering furnace for promoting sintering to obtain a mixture B, wherein the sintering furnace has a sintering temperature of 900-1200° C. and a sintering time of 20-60 min;

step III: placing the mixture B obtained in the step II in a cooling roller for cooling to obtain a mixture C, wherein the cooling roller has a rotating speed of 3-7 rmp and a cooling time of 1-2 h;

step IV: placing the mixture C obtained in the step III in a ball mill for ball milling to obtain a mixture D, wherein the ball mill has a rotating speed of 300-350 rmp and a ball milling time of 2-6 h;

step V: placing the mixture D obtained in the step IV in a vibrating screen of 150-250 mesh for screening, and then placing the screened mixture D in an oven for drying at a temperature of 80-150° C. for 2-6 h to obtain the glass powder for N-type silver-aluminum paste.

The present invention will be further understood by reference to the following detailed description of preferred implementations of the present invention and the examples included therein. Unless otherwise specified, all technical and scientific terms used herein have the same meanings as those commonly understood by those skilled in the art to which the present application belongs. To the extent that a definition of a particular term disclosed in the prior art is inconsistent with any definitions provided herein, the definition of the term provided herein controls.

As used herein, a feature that does not define a singular or plural form is also intended to include a plural form of the feature unless otherwise specified clearly in the context. It will be further understood that the term "prepared from . . . ", as used herein, is synonymous with "containing", "comprising", "including", "having," "contains" and/or "comprises", and when used in the specification, denotes the stated composition, step, method, article, or device, but does not preclude the presence or addition of one or more other compositions, steps, methods, articles, or devices. Furthermore, when describing implementations of the present application, "preferred", "preferably", "more preferably" and the like are used to refer to embodiments of the present invention that may provide certain benefits under certain circumstances. However, other embodiments may also be preferred under the same or other circumstances. In addition, the recitation of one or more preferred embodiments does not imply that other embodiments are not available, nor is it intended to exclude other embodiments from the scope of the present invention.

Example 1

The glass powder for N-type silver-aluminum paste of the present invention is a composition of formula (I):

$$Pb_a\text{—}Si_b\text{—}Tl_c\text{—}Zn_d\text{—}M_e\text{—}O_f, \qquad \text{formula (I)};$$

wherein a, b, c, d, e and f represent the amount of substance of elements contained in the glass powder for N-type silver-aluminum paste per 1 mol, and a=0.7 mol, b=0.1 mol, c=0.065 mol, d=0.05 mol, e=0.01 mol, and f has an amount of substance which balances the group consisting of Pb element, Si element, Tl element, Zn element and M element.

Figure 2:
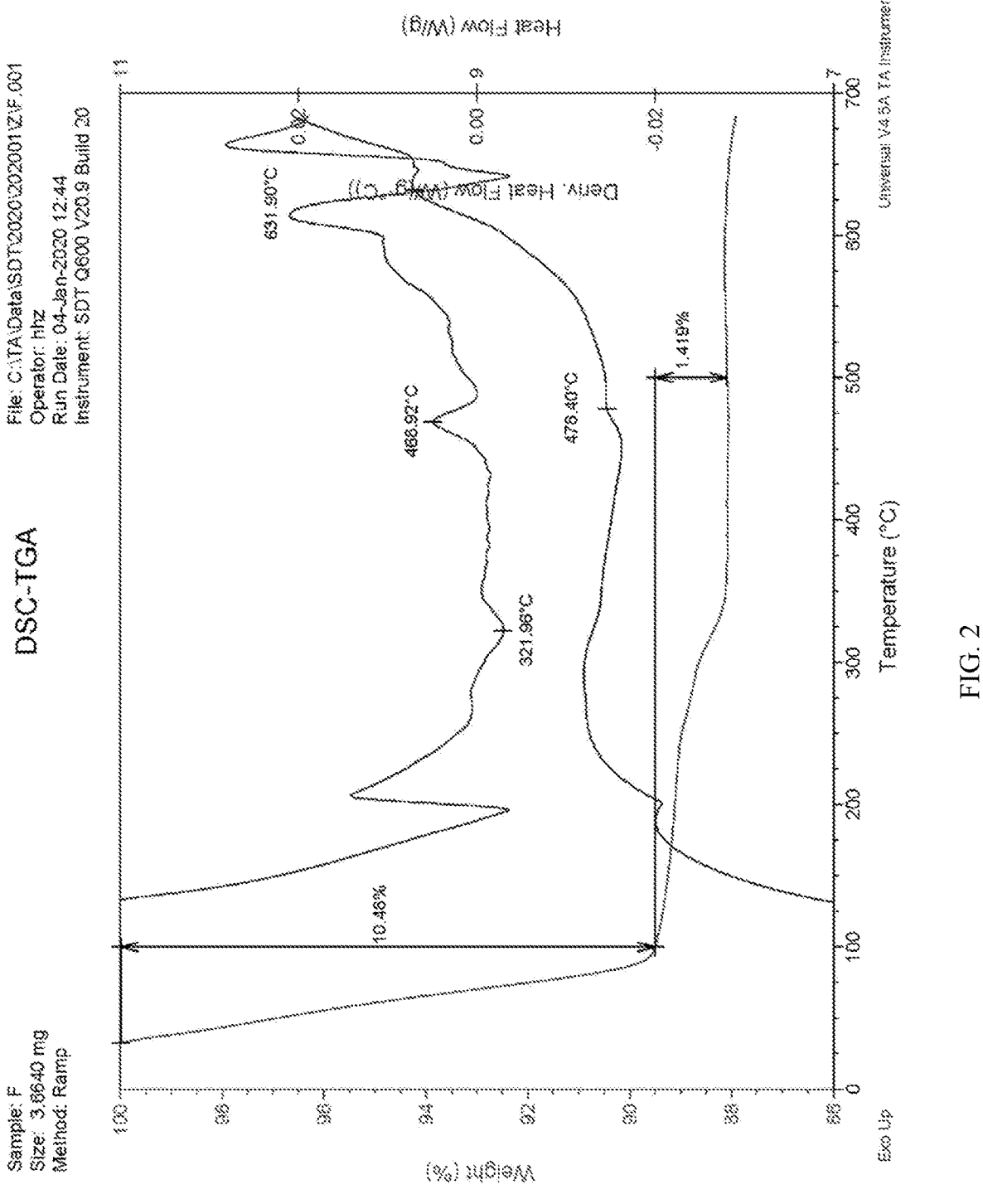
FIG. 2 is a DSC diagram of the glass powder for N-type silver-aluminum paste prepared in example 1 of the present invention.

According to the above formula, the glass powder for N-type silver-aluminum paste of the present invention according to the above formula is prepared as follows:

step I: accurately weighing lead dioxide, silicon dioxide, thallium oxide, zinc oxide and sodium oxide after calculating their amounts, and uniformly mixing and stirring them to obtain a mixture A;

step II: placing the mixture A obtained in the step I in a sintering furnace for promoting sintering to obtain a mixture B, wherein the sintering furnace has a sintering temperature of 1000° C. and a sintering time of 40 min;

step III: placing the mixture B obtained in the step II in a cooling roller for cooling to obtain a mixture C, wherein the cooling roller has a rotating speed of 5 rmp and a cooling time of 1 h;

step IV: placing the mixture C obtained in the step III in a ball mill for ball milling to obtain a mixture D, wherein the ball mill has a rotating speed of 325 rmp and a ball milling time of 4 h;

step V: placing the mixture D obtained in the step IV in a vibrating screen of 200 mesh for screening, and then placing the screened mixture D in an oven for drying at a temperature of 110° C. for 4 h to obtain the glass powder for N-type silver-aluminum paste. The prepared glass powder for N-type silver-aluminum paste has a median particle size of 1 μm and a softening point of 321.96° C., and a DSC chart of the glass powder of the example is shown in FIG. 2.

Example 2

The glass powder for N-type silver-aluminum paste of the present invention is a composition of formula (I):

$$Pb_a\text{—}Si_b\text{—}Tl_c\text{—}Zn_d\text{—}M_e\text{—}O_f, \qquad \text{formula (I)};$$

wherein a, b, c, d, e and f represent the amount of substance of elements contained in the glass powder for N-type silver-aluminum paste per 1 mol, and a=0.8 mol, b=0.2 mol, c=0.1 mol, d=0.1 mol, e=0.02 mol, and f has an amount of substance which balances the group consisting of Pb element, Si element, Tl element, Zn element and M element.

According to the above formula, the glass powder for N-type silver-aluminum paste of the present invention according to the above formula is prepared as follows:

step I: accurately weighing of lead oxide, silicon dioxide, thallium oxide, zinc chloride and potassium chloride after calculating their amounts, and uniformly mixing and stirring them to obtain a mixture A;

step II: placing the mixture A obtained in the step I in a sintering furnace for promoting sintering to obtain a mixture B, wherein the sintering furnace has a sintering temperature of 900° C. and a sintering time of 60 min;

step III: placing the mixture B obtained in the step II in a cooling roller for cooling to obtain a mixture C, wherein the cooling roller has a rotating speed of 7 rmp and a cooling time of 1 h;

step IV: placing the mixture C obtained in the step III in a ball mill for ball milling to obtain a mixture D, wherein the ball mill has a rotating speed of 300 rmp and a ball milling time of 6 h;

step V: placing the mixture D obtained in the step IV in a vibrating screen of 150 mesh for screening, and then placing the screened mixture D in an oven for drying at a temperature of 150° C. for 2 h to obtain the glass powder for N-type silver-aluminum paste. The prepared glass powder for N-type silver-aluminum paste has a median particle size of 0.5 μm and a softening point of 450° C.

Example 3

The glass powder for N-type silver-aluminum paste of the present invention is a composition of formula (I):

$$Pb_a\text{—}Si_b\text{—}Tl_c\text{—}Zn_d\text{—}M_e\text{—}O_f, \qquad \text{formula (I)};$$

wherein a, b, c, d, e and f represent the amount of substance of elements contained in the glass powder for N-type silver-aluminum paste per 1 mol, and a=0.6 mol, b=0.05 mol, c=0.03 mol, d=0.01 mol, e=0.001 mol, and f has an amount of substance which balances the group consisting of Pb element, Si element, Tl element, Zn element and M element.

According to the above formula, the glass powder for N-type silver-aluminum paste of the present invention according to the above formula is prepared as follows:

step I: accurately weighing the amounts of lead oxide, silicon dioxide, thallium oxide, zinc oxide and lithium oxide after calculating their weights, and uniformly mixing and stirring them to obtain a mixture A;

step II: placing the mixture A obtained in the step I in a sintering furnace for promoting sintering to obtain a mixture B, wherein the sintering furnace has a sintering temperature of 1200° C. and a sintering time of 20 min;

step III: placing the mixture B obtained in the step II in a cooling roller for cooling to obtain a mixture C, wherein the cooling roller has a rotating speed of 7 rmp and a cooling time of 1 h;

step IV: placing the mixture C obtained in the step III in a ball mill for ball milling to obtain a mixture D, wherein the ball mill has a rotating speed of 350 rmp and a ball milling time of 2 h;

step V: placing the mixture D obtained in the step IV in a vibrating screen of 250 mesh for screening, and then placing the screened mixture D in an oven for drying at a temperature of 150° C. for 2 h to obtain the glass powder for N-type silver-aluminum paste. The prepared glass powder for N-type silver-aluminum paste has a median particle size of 0.5 μm and a softening point of 300° C.

Example 4

The glass powder for N-type silver-aluminum paste of the present invention is a composition of formula (I):

$$Pb_a—Si_b—Tl_c—Zn_d—M_e—O_f, \quad \text{formula (I);}$$

wherein a, b, c, d, e and f represent the amount of substance of elements contained in the glass powder for N-type silver-aluminum paste per 1 mol, and a=0.7 mol, b=0.1 mol, c=0.065 mol, d=0.05 mol, e=0.01 mol, and f has an amount of substance which balances the group consisting of Pb element, Si element, Tl element, Zn element and M element.

According to the above formula, the glass powder for N-type silver-aluminum paste of the present invention according to the above formula is prepared as follows:

step I: accurately weighing the amounts of lead oxide, silicon dioxide, thallium oxide, zinc oxide and lithium oxide after calculating their weights, and uniformly mixing and stirring them to obtain a mixture A;

step II: placing the mixture A obtained in the step I in a sintering furnace for promoting sintering to obtain a mixture B, wherein the sintering furnace has a sintering temperature of 1200° C. and a sintering time of 20 min;

step III: placing the mixture B obtained in the step II in a cooling roller for cooling to obtain a mixture C, wherein the cooling roller has a rotating speed of 7 rmp and a cooling time of 1 h;

step IV: placing the mixture C obtained in the step III in a ball mill for ball milling to obtain a mixture D, wherein the ball mill has a rotating speed of 350 rmp and a ball milling time of 2 h;

step V: placing the mixture D obtained in the step IV in a vibrating screen of 250 mesh for screening, and then placing the screened mixture D in an oven for drying at a temperature of 150° C. for 2 h to obtain the glass powder for N-type silver-aluminum paste. The prepared glass powder for N-type silver-aluminum paste has a median particle size of 1.5 μm and a softening point of 321° C.

Example 5

The glass powder for N-type silver-aluminum paste of the present invention is a composition of formula (I):

$$Pb_a—Si_b—Tl_c—Zn_d—M_e—O_f, \quad \text{formula (I);}$$

wherein a, b, c, d, e and f represent the amount of substance of elements contained in the glass powder for N-type silver-aluminum paste per 1 mol, and a=0.8 mol, b=0.2 mol, c=0.1 mol, d=0.1 mol, e=0.02 mol, and f has an amount of substance which balances the group consisting of Pb element, Si element, Tl element, Zn element and M element.

According to the above formula, the glass powder for N-type silver-aluminum paste of the present invention according to the above formula is prepared as follows:

step I: accurately weighing of lead oxide, silicon dioxide, thallium oxide, zinc chloride and potassium chloride after calculating their amounts, and uniformly mixing and stirring them to obtain a mixture A;

step II: placing the mixture A obtained in the step I in a sintering furnace for promoting sintering to obtain a mixture B, wherein the sintering furnace has a sintering temperature of 900° C. and a sintering time of 60 min;

step III: placing the mixture B obtained in the step II in a cooling roller for cooling to obtain a mixture C, wherein the cooling roller has a rotating speed of 7 rmp and a cooling time of 1 h;

step IV: placing the mixture C obtained in the step III in a ball mill for ball milling to obtain a mixture D, wherein the ball mill has a rotating speed of 300 rmp and a ball milling time of 6 h;

step V: placing the mixture D obtained in the step IV in a vibrating screen of 250 mesh for screening, and then placing the screened mixture D in an oven for drying at a temperature of 150° C. for 2 h to obtain the glass powder for N-type silver-aluminum paste. The prepared glass powder for N-type silver-aluminum paste has a median particle size of 0.8 μm and a softening point of 341.2° C.

Comparative Example 1

In this comparative example, the glass powder does not contain thallium element, the amount of lead element is the sum of the amount of thallium element and lead element in example 1, and the remaining operations are the same as those in example 1. The glass powder for N-type silver-aluminum paste prepared in this comparative example has a median particle size of 0.5-2 μm and a softening point of 300-450° C.

Experimental Example

N-type silver-aluminum pastes prepared from the glass powder of the above examples 1-5 and comparative example are screen printed on a 156 mm×156 mm N-type polysilicon wafer, respectively. After printing, those pastes are dried, sintered at high temperature, and tested for various performances, including voltage of open circuit (Voc), photoelectric conversion efficiency (EFF), fill factor (FF), parallel resistance (Rsh), series resistance (Rs), short circuit current (Isc), respectively. The test methods of each index are conventional methods in the field, and the specific test process and conditions are both unified in the test. The test results are shown in table 1:

TABLE 1

|  | Voc/V | Rsh/Ω | Rs/Ω | Isc/A | EFF/% | FF/% |
|---|---|---|---|---|---|---|
| Example 1 | 0.6680 | 265.51 | 0.0023 | 9.5612 | 21.56 | 79.65 |
| Example 2 | 0.6683 | 264.15 | 0.0024 | 9.4625 | 21.64 | 79.86 |
| Example 3 | 0.6675 | 263.56 | 0.0025 | 9.6574 | 21.61 | 80.56 |

TABLE 1-continued

|  | Voc/V | Rsh/Ω | Rs/Ω | Isc/A | EFF/% | FF/% |
|---|---|---|---|---|---|---|
| Example 4 | 0.6679 | 265.2 | 0.0021 | 9.5487 | 21.57 | 80.23 |
| Example 5 | 0.6679 | 264.2 | 0.0026 | 9.6874 | 21.58 | 80.56 |
| Comparative Example | 0.6656 | 282.6 | 0.00211 | 9.3254 | 21.30 | 79.21 |

As can be seen from table 1, the N-type silver-aluminum pastes prepared from the glass powder for N-type silver-aluminum paste in examples 1-5 of the present invention have good electrical performances, and have excellent performance representation in terms of fill factor (FF), contact resistance (Rs), voltage of open circuit (Voc), and comprehensive electrical performances EFF.

Finally, it should be noted that the above descriptions are only preferred examples of the present invention and are not intended to limit the present invention, and any modifications, equivalents and improvements made within the spirit and principle of the present invention should be included in the protection scope of the present invention.

What is claimed is:

1. A glass powder for N-type silver-aluminum paste, comprising a lead-containing compound, a silicon-containing compound, a thallium-containing compound and a zinc-containing compound;

wherein the glass powder for N-type silver-aluminum paste is a composition of formula (I):

$$Pb_a\!-\!Si_b\!-\!Tl_c\!-\!Zn_d\!-\!M_e\!-\!O_f; \qquad \text{formula (I);}$$

wherein a, b, c, d, e and f represent the amount of substance of elements contained in the glass powder for N-type silver-aluminum paste per 1 mol, and 0.6 mol≤a≤0.8 mol, 0.05 mol≤b≤0.2 mol, 0.03 mol≤c≤0.1 mol, 0.01 mol≤d≤0.1 mol, 0.001 mol≤e≤0.02 mol, and f has an amount of substance which balances the group consisting of Pb element, Si element, Tl element, Zn element and M element, wherein the M element is at least one of lithium element, sodium element, potassium element, rubidium element and cesium element.

2. The glass powder for N-type silver-aluminum paste according to claim 1, wherein the lead-containing compound is at least one of an oxide, a halide, a nitrate compound, a nitrite compound, a carbonate compound, a bicarbonate compound, a sulfate compound, and a phosphate compound; the silicon-containing compound is at least one of an oxide, a halide, a nitrate compound, a nitrite compound, a carbonate compound, a bicarbonate compound, a sulfate compound, and a phosphate compound; the thallium-containing compound is at least one of an oxide, a halide, a nitrate compound, a nitrite compound, a carbonate compound, a bicarbonate compound, a sulfate compound, and a phosphate compound; and the zinc-containing compound is at least one of an oxide, a halide, a nitrate compound, a nitrite compound, a carbonate compound, a bicarbonate compound, a sulfate compound, and a phosphate compound.

3. The glass powder for N-type silver-aluminum paste according to claim 2, wherein any selected halide is at least one of chloride, fluoride, bromide and iodide when a halide compound is selected.

4. The glass powder for N-type silver-aluminum paste according to claim 3, wherein the halide is chloride when the halide compound is selected.

5. The glass powder for N-type silver-aluminum paste according to claim 1, further comprising a compound containing a first main group metal element.

6. The glass powder for N-type silver-aluminum paste according to claim 5, wherein the lead-containing compound containing the first main group metal element is at least one of a lithium-containing compound, a sodium-containing compound, a potassium-containing compound, a rubidium-containing compound, and a cesium-containing compound; the silicon-containing compound containing the first main group metal element is at least one of a lithium-containing compound, a sodium-containing compound, a potassium-containing compound, a rubidium-containing compound, and a cesium-containing compound; the thallium-containing compound containing the first main group metal element is at least one of a lithium-containing compound, a sodium-containing compound, a potassium-containing compound, a rubidium-containing compound, and a cesium-containing compound; and the zinc-containing compound containing the first main group metal element is at least one of a lithium-containing compound, a sodium-containing compound, a potassium-containing compound, a rubidium-containing compound, and a cesium-containing compound.

7. The glass powder for N-type silver-aluminum paste according to claim 1, wherein the glass powder for N-type silver-aluminum paste has a median particle size of 0.5-2 μm.

8. The glass powder for N-type silver-aluminum paste according to claim 1, wherein the glass powder for N-type silver-aluminum paste has a softening temperature of 300-450° C.

9. The glass powder for N-type silver-aluminum paste according to claim 1, wherein the glass powder is prepared as follows:

step I: accurately weighing a lead-containing compound, a silicon-containing compound, a thallium-containing compound and a zinc-containing compound after calculating their amounts, and uniformly mixing and stirring them to obtain a mixture A;

step II: placing the mixture A obtained in the step I in a sintering furnace for promoting sintering to obtain a mixture B, wherein the sintering furnace has a sintering temperature of 900-1200° C. and a sintering time of 20-60 min;

step III: placing the mixture B obtained in the step II in a cooling roller for cooling to obtain a mixture C, wherein the cooling roller has a rotating speed of 3-7 rmp and a cooling time of 1-2 h;

step IV: placing the mixture C obtained in the step III in a ball mill for ball milling to obtain a mixture D, wherein the ball mill has a rotating speed of 300-350 rmp and a ball milling time of 2-6 h;

step V: placing the mixture D obtained in the step IV in a vibrating screen of 150-250 mesh for screening, and then placing the screened mixture D in an oven for drying at a temperature of 80-150° C. for 2-6 h to obtain the glass powder for N-type silver-aluminum paste.

* * * * *